US012764492B2

(12) United States Patent
Yang et al.

(10) Patent No.: US 12,764,492 B2
(45) Date of Patent: Oct. 13, 2026

(54) CONTENT SHARING BASED ON LOCATION

(71) Applicant: Hewlett-Packard Development Company, L.P., Spring, TX (US)

(72) Inventors: Guoxing Yang, Spring, TX (US); Alexander Wayne Clark, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 371 days.

(21) Appl. No.: 18/042,583

(22) PCT Filed: Oct. 21, 2020

(86) PCT No.: PCT/US2020/056597

§ 371 (c)(1),
(2) Date: Feb. 22, 2023

(87) PCT Pub. No.: WO2022/086515

PCT Pub. Date: Apr. 28, 2022

(65) Prior Publication Data

US 2023/0336939 A1 Oct. 19, 2023

(51) Int. Cl.

| | |
|---|---|
| ***H04W 4/021*** | (2018.01) |
| ***G01S 5/02*** | (2010.01) |
| ***G01S 13/02*** | (2006.01) |
| ***H04L 67/06*** | (2022.01) |

(52) U.S. Cl.
CPC ........... *H04W 4/021* (2013.01); *G01S 5/0284* (2013.01); *G01S 13/0209* (2013.01); *H04L 67/06* (2013.01)

(58) Field of Classification Search
CPC ..... H04W 4/021; H04W 4/022; H04W 4/023; H04W 4/025; H04W 4/026; H04W 4/029; H04W 4/14; H04W 4/18; G01S 5/0284; G01S 13/0209; H04L 67/06; H04L 12/12
USPC ........................................................ 455/456.3
See application file for complete search history.

(56) References Cited

U.S. PATENT DOCUMENTS 9,282,423 B2 3/2016 Luna
9,491,237 B1 11/2016 Garg et al.
10,142,781 B2 * 11/2018 Vamaraju ................ H04W 4/20
10,356,234 B2 * 7/2019 Whitehorn ........ H04M 1/72403
10,631,146 B1 4/2020 Andrews et al.
10,638,090 B1 * 4/2020 Sculley ................. H04L 65/403
10,674,317 B2 6/2020 Arunachalam et al.
10,802,708 B2 * 10/2020 Lee ................... H04M 1/27475
2005/0096065 A1 * 5/2005 Fleischman ............. H04L 45/16 455/456.1
2005/0272436 A1 * 12/2005 Trott ..................... H04W 28/18 455/516

(Continued)

FOREIGN PATENT DOCUMENTS

EP 3684031 A1 7/2020

*Primary Examiner* — Jean A Gelin
(74) *Attorney, Agent, or Firm* — Quarles & Brady LLP

(57) ABSTRACT

An example electronic device includes a display device to display content, a transceiver to exchange ranging messages with a location device to enable the location device to locate the electronic device relative to the location device, and a processor. In response to the electronic device being located in a first zone of an external electronic device, the processor is to receive identification information of the external electronic device, and in response to receiving the identification information, the processor is to share the content with the external electronic device.

20 Claims, 10 Drawing Sheets

800

(56) References Cited

U.S. PATENT DOCUMENTS

| | | | | |
|---|---|---|---|---|
| 2011/0283334 | A1* | 11/2011 | Choi | H04L 67/148<br>725/148 |
| 2014/0082696 | A1* | 3/2014 | Danev | G06F 21/31<br>726/3 |
| 2014/0207889 | A1* | 7/2014 | King | G06Q 10/107<br>709/206 |
| 2014/0236724 | A1 | 8/2014 | Jain | |
| 2014/0270698 | A1 | 9/2014 | Luna et al. | |
| 2016/0142913 | A1* | 5/2016 | Ghosh | H04W 12/08<br>726/5 |
| 2016/0249165 | A1* | 8/2016 | Aldana | G01S 5/0236 |
| 2017/0048292 | A1* | 2/2017 | Lee | H04L 67/06 |
| 2017/0230617 | A1 | 8/2017 | Dunn et al. | |
| 2018/0099643 | A1* | 4/2018 | Golsch | B60R 25/24 |
| 2020/0106877 | A1* | 4/2020 | Ledvina | H04W 12/06 |
| 2020/0314586 | A1 | 10/2020 | Bouba et al. | |
| 2020/0356221 | A1* | 11/2020 | Behzadi | G06F 3/0482 |
| 2020/0404448 | A1* | 12/2020 | Park | G06Q 20/3224 |
| 2021/0209364 | A1* | 7/2021 | Park | G06F 3/013 |
| 2021/0400427 | A1* | 12/2021 | Burowski | H04W 74/0808 |
| 2021/0400434 | A1* | 12/2021 | Bishop, Jr. | G01S 3/50 |

* cited by examiner

800

1000

1100

CONTENT SHARING BASED ON LOCATION

BACKGROUND

An electronic device, for example, a laptop, tablet, or smartphone, may display content, for example, on a screen of the electronic device. The content displayed on the screen of the electronic device may be shared with an external electronic device. For example, the electronic device may share content with the external electronic device by connecting the electronic devices together with a cable, by a peer-to-peer wireless connection between the electronic device and the external electronic device, by using a content-sharing application having a security code, or by other methods.

DETAILED DESCRIPTION

Figure 1:
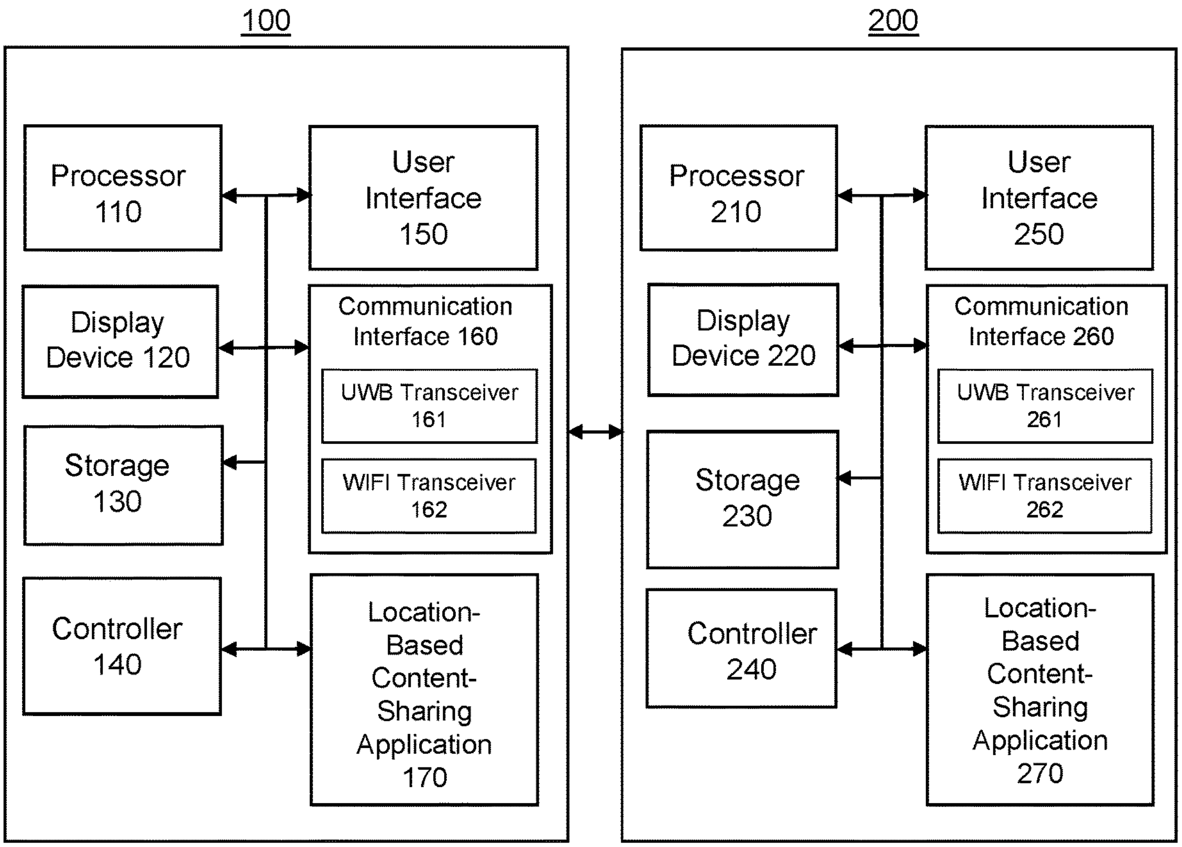
FIG. 1 illustrates an example block diagram of an electronic device and external electronic device, according to examples of the disclosure.

Various examples of the disclosure will now be described with reference to the accompanying drawings, wherein like reference characters denote like elements. Examples to be explained in the following may be modified and implemented in various different forms.

As mentioned above, there are many methods to share content displayed on a screen of an electronic device with another electronic device, i.e., an external electronic device. However, these methods may involve manual inputs by a user of the electronic device to allow the electronic device to share its content with the external electronic device. For example, a user may have to manually connect a cable (for example, an HDMI cable, a DisplayPort cable, a USB-C cable, and the like) between the electronic device and the external electronic device. As another example, a user may have to make several manual inputs to establish a peer-to-peer connection (for example, via MIRACAST) between the electronic device and the external electronic device. For example, the user may need to provide an input to open an application used to establish the peer-to-peer connection, and may need to provide an input to select the external electronic device to share content with. As another example, a user may have to make several manual inputs to share content through a content-sharing application. For example, the user may need to provide manual inputs to open or launch the content-sharing application, select the external electronic device to share content with, and enter a security code to confirm the request for content sharing.

According to examples described herein, content may be shared intuitively with minimal inputs by a user, based on a location of the electronic device which is to share its content. For example, location-based content sharing may be fully automated because a user does not have to plug in a cable, make an input to open an application to allow content sharing, or enter a security code to connect to the electronic device to which the content is to be shared.

A location of the electronic device may be determined by using ultra-wideband (UWB) radio technology. Compared to BLUETOOTH or WI-FI, UWB radio technology may enable very accurate real-time measurements of a location of an object. For example, UWB radio technology may use a time-of-flight of a radio frequency signal to calculate a distance from a transmitting or initiating UWB device (e.g., a UWB transceiver tag) to a receiving or responding UWB device (e.g., a UWB transceiver anchor). The accuracy of the distance calculation may be about 5 to 30 cm, for example, about 10 cm. The physical properties of the UWB radio frequency signal also enables real-time, reliable localization, and data communication. It is also energy efficient due to its ultra-short air time.

According to examples described herein, a location of the electronic device which is to share content may be determined by using a UWB transceiver tag included with the electronic device, and a UWB transceiver anchor which receives a radio frequency signal transmitted from the UWB transceiver tag. The UWB transceiver anchor may be provided in a location near or at the location of an external electronic device to which content is to be shared. For example, the UWB transceiver anchor may be disposed in a room, for example, a conference room, or a plurality of UWB transceiver anchors may be disposed about the room, a building in which the room is provided, and the like. The external electronic device to which content is to be shared may be a smart display disposed in the conference room. For example, a UWB transceiver anchor may be disposed at the external electronic device to which content is to be shared. According to examples described herein, a location of the electronic device relative to a UWB transceiver anchor, a room, a building, the external electronic device, or combinations thereof, may be determined.

A trigger zone (first zone) and a sharing zone (second zone) may be defined and stored in a memory of the external electronic device so that sharing of content between the electronic device and external electronic device may be based on whether the electronic device is located within the trigger zone, the sharing zone, or outside of the sharing zone.

The trigger zone may be a space or region in a room in which the external electronic device is located, for example a two-dimensional area or a three-dimensional volume. A location of the trigger zone, for example boundaries or dimensions of the trigger zone, may be defined relative to a location of the external electronic device or relative to a location of a location device having a UWB transceiver (e.g., an anchor) which transmits location information of the electronic device to the external electronic device. When the electronic device is located in the trigger zone, the electronic device may share content with the external electronic device. For example, the trigger zone may be a designated space in a room where, if a user moves or places their electronic device in the trigger zone, it may be understood or implied that the user intends or wants to share the content.

The sharing zone may also be a space or region in a room in which the external electronic device is located, for example a two-dimensional area or a three-dimensional volume. The sharing zone may be a space corresponding to a size of the room, for example. A location of the sharing zone, for example boundaries or dimensions of the sharing zone, may be defined relative to a location of the external electronic device or relative to a location of a location device having a UWB transceiver (e.g., an anchor) which transmits location information of the electronic device to the external electronic device. The sharing zone overlaps the trigger zone. For example, the trigger zone may be entirely contained within the sharing zone. When the electronic device is located in the sharing zone after having been located in the trigger zone, the electronic device may continue to share content with the external electronic device. When the electronic device is located outside of the sharing zone, the electronic device may stop sharing content with the external electronic device. For example, the sharing zone may be a designated space in a room where, if a user has begun to share content, it may be understood or implied that the user intends or wants to continue to share the content if the electronic device remains in the sharing zone, and that the user intends or wants to discontinue sharing content if the electronic device is moved out of the sharing zone.

The trigger zone and sharing zone may be defined by a user and stored, for example, in a server or at the external electronic device. According to examples described herein the trigger zone and sharing zone may be defined or configured by use of an augmented-reality (AR) application which may be executed using a smart phone having a UWB chip or by using a UWB zone marker device. The shape of the trigger zone and sharing zone may be any shape, for example a polygonal shape, circular shape, oval shape, and the like. There may be a plurality of trigger zones within a sharing zone.

In an example where the electronic device is a notebook computer, when two users enter a conference room (a sharing zone) and one of the users moves her notebook computer to an area (a trigger zone) in front of a smart display (external electronic device) for a minimum amount of time (e.g., one or two seconds), the screen of the notebook computer is shared and displayed on the smart display automatically. Sharing of the notebook computer of the first user may continue if the first user withdraws or moves her notebook computer from the trigger zone so long as the notebook computer remains within the conference room (sharing zone).

In an example, when a second user wants to share his screen and moves his notebook computer to the area in front of the room display for the minimum amount of time, the smart display switches to automatically display the screen of the notebook computer of the second user, and sharing between the notebook computer of the first user and the smart display is stopped. As another example, the smart display may instead simultaneously display the screens of the first user and the second user, for example, by splitting the screen of the room display in two. Sharing of the notebook computer of the second user may continue if the second user withdraws or moves his notebook computer from the trigger zone so long as the notebook computer remains within the conference room (sharing zone).

Sharing between the notebook computer of the first user and the smart display may be stopped if the notebook computer of the first user is taken out of the conference room (sharing zone). Likewise, sharing between the notebook computer of the second user and the smart display may be stopped if the notebook computer of the second user is taken out of the conference room (sharing zone).

Referring to FIG. 1, a block diagram of an electronic device and external electronic device is illustrated, according to examples of the disclosure.

The electronic device 100 may include a processor 110, a display device 120, a storage device 130, a controller 140, a user interface 150, a communication interface 160, and a location-based content-sharing application 170. The electronic device 100 may include, but is not limited to, notebook computers, tablets, smart phones, and the like. The electronic device 100 may include other components which are not shown in FIG. 1, and is not limited to the example components shown in FIG. 1. That is, the electronic device 100 may include more or less components than those shown in FIG. 1. For example, the electronic device 100 may include an operating system (OS) and a basic input/output system (BIOS).

The processor 110 of the electronic device 100 may execute instructions stored in the storage device 130. The processor 110 may be, for example, an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor, or combinations thereof.

The display device 120 may include a liquid crystal display (LCD), a light emitting diode (LED) display, an organic light emitting diode (OLED) display, active matrix organic light emitting diode (AMOLED), flexible display, 3D display, a plasma display panel (PDP), a cathode ray tube (CRT) display, and the like, for example. The display device 120 may also include a touchscreen display to receive a user input.

The storage device (memory) 130 of the electronic device 100 may include, for example, a computer readable storage medium which may be any electronic, magnetic, optical, or other physical storage device that stores executable instructions. For example, the storage device 130 may include a nonvolatile memory device, such as a Read Only Memory (ROM), Programmable Read Only Memory (PROM), Erasable Programmable Read Only Memory (EPROM), and flash memory, a USB drive, a volatile memory device such as a Random Access Memory (RAM), a hard disk, floppy disks, a blue-ray disk, or optical media such as CD ROM discs and DVDs, or combinations thereof.

The electronic device 100 may include a controller 140. The controller 140 may be an embedded controller, for example. The controller 140 may be used for various operations of the electronic device 100. For example, the controller 140 may act as a pass-through for communications between the communication interface 160 and the processor 110. For example, the controller 140 may be connected with the communication interface 160 via a Serial Peripheral Interface (SPI). For example, the controller 140 may act as a pass-through for communications between the UWB transceiver 161 and the processor 110 via the SPI. The controller 140 may also perform security-related functions when the electronic device 100 is powered off.

The electronic device 100 may include a user interface 150 to receive an input from a user to control an operation of the electronic device 100, and the display device 120 may display information regarding the electronic device 100. The user interface 150 may include, for example, a keyboard, a mouse, a joystick, a button, a switch, an electronic pen or stylus, a gesture recognition sensor, an input sound device or voice recognition sensor such as a microphone, an output sound device such as a speaker, a track ball, a remote control, a touchscreen, or combinations thereof. The display device 120 may also act as a user interface when the display device 120 includes a touchscreen, for example.

The electronic device 100 may include a communication interface 160. Electronic device 100 may be connected with or communicate with the external electronic device 200, for example through communication interface 160 via a wired or wireless connection. The wireless connection may be over a network such as a wireless local area network (WLAN), wide area network (WAN), WI-FI Direct or the like, and an ultra-wideband (UWB) network. For example, a wired communication connection may be made via a pair cable, a coaxial cable, an optical fiber cable, an Ethernet cable, and the like.

The electronic device 100 may include a UWB transceiver 161 which may be used to transmit and receive information, for example ranging messages, through a UWB network. The UWB transceiver 161 may include an integrated circuit (IC) chip and an antenna or a plurality of antennas, for example. For example, the UWB communication may be performed at frequencies ranging from 3.1 GHz to 10.5 GHz, where each channel has a bandwidth of at least 500 MHz.

The electronic device 100 may include a WI-FI transceiver 162 which may be used to transmit and receive information wirelessly through a WI-FI connection such as WLAN, WI-FI DIRECT, MIRACAST, and the like. For example, WI-FI communication may be performed in the 2.4 GHz or 5 GHz frequency bands, where each channel has a bandwidth of 5 MHz or 20 MHz, respectively.

The electronic device 100 may include a location-based content-sharing application 170. The location-based content-sharing application 170 may include instructions to launch a screen casting application based on a location of the electronic device 100 so that content displayed by the display device 120 may be shared with the external electronic device 200. For example, external electronic device 200 may mirror the contents which are displayed by the display device 120. The location-based content-sharing application 170 may also include instructions to stop sharing content based on a location of the electronic device 100. The location of the electronic device 100 may be determined by the electronic device 100 itself, or the electronic device 100 may receive location information of the electronic device 100 from external electronic device 200, a location device 300 (see FIG. 2), or another device.

The external electronic device 200 may include similar components as the electronic device 100, such as a processor 210, a display device 220, a storage device (memory) 230, a controller 240, a user interface 250, and a communication interface 260 including a UWB transceiver 261 and a WI-FI transceiver 262, and repeated descriptions of these components and their operations will be omitted for the sake of brevity. The external electronic device 200 may include, but is not limited to, smart displays, notebook computers, tablets, laptops, smart phones, and the like.

The external electronic device 200 may include a location-based content-sharing application 270. The location-based content-sharing application 270 may include instructions to determine a location of the electronic device 100, instructions to transmit identification information of the external electronic device 200 to the electronic device 100, instructions to transmit information notifying or informing the electronic device 100 that the electronic device 100 is located in a trigger zone, sharing zone, or outside of the sharing zone, instructions to request or direct the electronic device 100 to share or stop sharing content with external electronic device 200 based on the location of the electronic device 100, and the like. For example, external electronic device 200 may mirror the contents which are displayed by the display device 120. The location of the electronic device 100 may be determined by the external electronic device 200, or the external electronic device 200 may receive location information of the electronic device 100 from another device, for example from a remotely disposed server which receives location information of the electronic device 100 from the location device 300.

Figure 2:
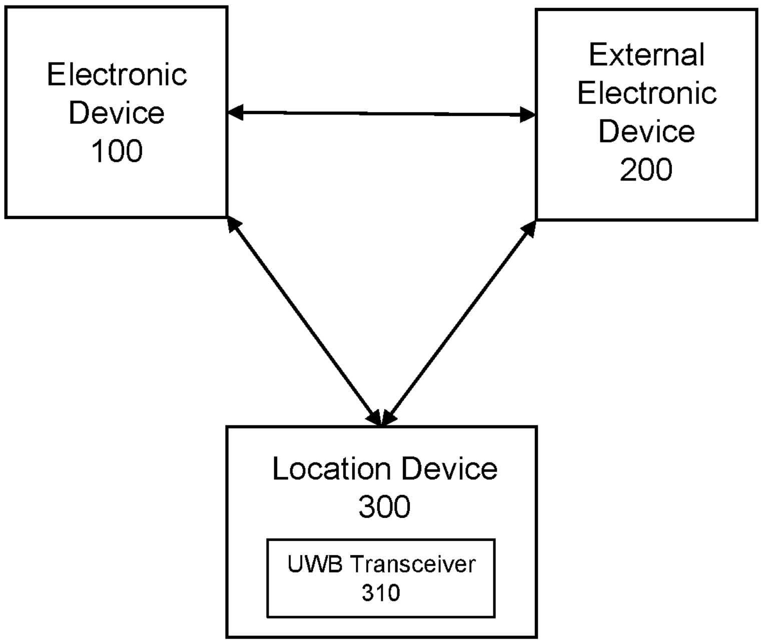
FIG. 2 illustrates an example block diagram of an example system including an electronic device, external electronic device, and location device, according to examples of the disclosure.

Referring to FIG. 2, a block diagram of an example system including an electronic device, external electronic device, and location device, is illustrated, according to examples of the disclosure.

In FIG. 2, the electronic device 100, external electronic device 200, and location 300 may communicate with one another, for example, over various wireless networks. Location device 300, which may also be referred to as an anchor, includes a UWB transceiver 310. For example, the electronic device 100 and location device 300 may communicate and exchange information with one another over a UWB network. For example, the external electronic device 200 and location device 300 may communicate and exchange information with one another over a UWB network. For example, the electronic device 100 and external electronic device 200 may communicate and exchange information with one another over a UWB network and a WI-FI network.

In some examples, the external electronic device 200 may include the location device 300 and the location device 300 may be disposed at (for example, integrated with), the external electronic device 200. In some examples, the system may include a plurality of location devices (anchors) 300 which communicate and exchange information with the electronic device 100 and the external electronic device 200.

Referring FIGS. 1 and 2, example operations of the electronic device 100 will be described.

For example, the electronic device 100 includes the display device 120 which displays content. A user may share the content displayed by the display device 120 with the external electronic device 200 based on a location of the electronic device 100. A location of the electronic device 100 may be determined by the external electronic device 200 or the location device 300, for example. The communication interface 160, for example, the UWB transceiver 161, may exchange ranging messages with the UWB transceiver 310 of the location device 300 via a UWB communication protocol to enable the location device 300 to locate the electronic device 100 relative to the location device 300. For example, when the UWB transceiver 161 is within an operating range of UWB transceiver 310, the UWB transceiver 161 and UWB transceiver 310 may exchange ranging messages with each other. For example, the UWB transceiver 161 may act as an initiator to initiate a range measurement while UWB transceiver 310 may act as a responder which listens and responds to UWB transceiver 161. As another example, the UWB transceiver 161 may act as the responder and the UWB transceiver 310 may act as the initiator.

For example, the UWB transceiver 161 may calculate the range (distance) between UWB transceiver 161 and UWB transceiver 310, and transmit the range (distance) information back to the UWB transceiver 310. As another example, the UWB transceiver 310 may calculate the range (distance)

between UWB transceiver 161 and UWB transceiver 310. In some examples, the azimuth or angle of arrival information of the UWB transceiver 161 with respect to the UWB transceiver 310 may also be calculated by the UWB transceiver 161 or UWB transceiver 310. The range (distance) between UWB transceiver 161 and UWB transceiver 310 may be calculated based on a time-of-flight estimation using timestamps of transmission and reception times which are included in the ranging messages exchanged between the UWB transceiver 161 and UWB transceiver 310. A plurality of messages, may be exchanged between the UWB transceiver 161 and UWB transceiver 310 so that the range may be calculated. For example, two, three, or four messages may be exchanged between the UWB transceiver 161 and UWB transceiver 310 to calculate the range. However, the disclosure is not limited to these examples, and more than four messages may be exchanged. Measurement error may be reduced as more messages are sent; however, time and power may be saved as fewer messages are sent. As another example, a time difference of arrival (TDoA) method may be utilized to determine a location of the UWB transceiver 161 relative to the UWB transceiver 310.

For example, the UWB transceiver 310 may include dual receiving (RX) antennas for use as an anchor, and the UWB transceiver 310 may measure angle of arrival (AOA) information. For example, the UWB transceiver 261 of the external electronic device 200 may include dual receiving (RX) antennas for use as an anchor, and the UWB transceiver 261 may measure angle of arrival (AOA) information. For example, the UWB transceiver 161 of the electronic device 100 may include a single RX antenna.

The location device 300 may locate the electronic device 100 relative to the location device 300 as discussed above, and the location device 300 may provide relative location information of the electronic device 100, to the external electronic device 200. In some examples, a plurality of location devices 300 may be implemented to calculate or determine the relative location of the electronic device 100, and the plurality location devices 300 may provide respective location information of the electronic device 100, to the external electronic device 200.

The external electronic device 200 may determine, based on the location information of the electronic device 100 received from the location device(s), whether the electronic device 100 is located in a trigger zone (first zone) designated by the external electronic device 200, a sharing zone (second zone) designated by the external electronic device 200, or outside of the sharing zone. For example, if the external electronic device 200 determines the electronic device 100 is located in the trigger zone (first zone) of the external electronic device 200 or the sharing zone (second zone) of the external electronic device 200, the external electronic device 200 may transmit identification information of the external electronic device 200 to the electronic device 100. The identification information may be transmitted from the external electronic device 200 to the electronic device 100 via a UWB communication protocol, for example. For example, the identification information of the external electronic device 200 may include an internet protocol (IP address) of the external electronic device 200, a device name of the external electronic device 200, or other identifying information of the external electronic device 200.

For example, in response to the electronic device 100 being located in the trigger zone (first zone) of the external electronic device 200, the processor 110 may receive, from the external electronic device 200, the identification information of the external electronic device 200. The external electronic device 200 may not transmit the identification information unless the electronic device 100 is in the trigger zone for a certain amount of time, for example, one or two seconds, for example in case of inadvertent placement of the electronic device 100 in the trigger zone.

In response to receiving the identification information when the electronic device 100 has been located in the trigger zone, the processor 110 may share the content which is displayed by the display device 120 with the external electronic device 200. For example, the location-based content-sharing application 170 may be a program which includes instructions executed by the processor 110 to share the content with the external electronic device 200 via a WI-FI communication protocol, in response to receiving the identification information. For example, the location-based content-sharing application 170 may be a program which includes instructions executed by the processor 110 to automatically launch, without receiving an input from a user of the electronic device 100, a screen casting application (content-sharing application) to share the content with the external electronic device 200, in response to receiving the identification information. The screen casting application may be an application or program which allows the external electronic device 200 to mirror the contents displayed by display device 120 on the display device 220.

For example, when the electronic device 100 is moved outside of the sharing zone (second zone) designated by the external electronic device 200, the processor 110 may stop sharing the content with the external electronic device 200. For example, the location-based content-sharing application 170 may be a program which includes instructions executed by the processor 110 to terminate or close the screen casting application to stop sharing the content with the external electronic device 200, when the electronic device 100 is moved outside of the sharing zone.

As another example, in response to the electronic device 100 being located in the sharing zone of the external electronic device 200, the processor 110 may receive, from the external electronic device 200, the identification information of the external electronic device 200.

The electronic device 100 may subsequently receive trigger zone information from the external electronic device 200 in response to the electronic device 100 being located in the trigger zone. The external electronic device 200 may not transmit the trigger zone information unless the electronic device 100 is in the trigger zone for a certain amount of time, for example, one or two seconds, for example in case of inadvertent placement of the electronic device 100 in the trigger zone. The trigger zone information may be information which indicates to the electronic device 100 that the electronic device 100 is located in a trigger zone of the external electronic device 200 or may be information which includes instructions to the electronic device 100 to start sharing content with the external electronic device 200.

In response to the electronic device 100 receiving the trigger zone information, the processor 110 may share the content which is displayed by the display device 120 with the external electronic device 200. For example, the location-based content-sharing application 170 may be a program which includes instructions executed by the processor 110 to share the content with the external electronic device 200 via a WI-FI communication protocol, in response to receiving the trigger zone information. For example, the location-based content-sharing application 170 may be a program which includes instructions executed by the processor 110 to automatically launch, without receiving an input from a user of the electronic device 100, the screen casting application to share the content with the external electronic device 200, in response to receiving the trigger zone information.

According to examples described herein, the electronic device 100 may continue to share the content with the external electronic device 200 even when the electronic device 100 is withdrawn or moved from (located outside of) the trigger zone, so long as the electronic device 100 remains within the sharing zone. For example, after the processor 110 shares the content with the external electronic device 200 via the location-based content-sharing application 170 in response to receiving the identification information, when the electronic device 100 is located outside of the trigger zone (first zone), but is inside of the sharing zone (second zone), the processor 110 continues to share the content with the external electronic device 200 via the location-based content-sharing application 170.

For example, the processor 110 may, in response to the electronic device 100 receiving information from the external electronic device 200 indicating the electronic device 100 is located outside of the sharing zone (second zone) of the external electronic device 200, automatically stop sharing the content with the external electronic device 200. For example, the location-based content-sharing application 170 may be a program which includes instructions executed by the processor 110 to stop sharing the content with the external electronic device 200, in response to receiving information indicating the electronic device 100 is located outside of the sharing zone. For example, the location-based content-sharing application 170 may terminate or close the screen casting application, in response to receiving information indicating the electronic device 100 is located outside of the sharing zone.

Referring again to FIGS. 1 and 2, example operations of the external electronic device 200 will now be described.

For example, the storage device (memory) 230 of the external electronic device 200 stores location information (first location information) regarding the first zone (trigger zone) and location information (third location information) regarding the second zone (sharing zone). The sharing zone may overlap the trigger zone. For example, the trigger zone may be entirely contained within the sharing zone. For example, the trigger zone and sharing zone may be a two-dimensional space or a three-dimensional space, designated by the external electronic device 200. For example, the trigger zone and sharing zone may be defined such that they do not overlap with a location of the external electronic device 200. For example, there may be a plurality of trigger zones located within a single sharing zone. For example, the sharing zone may be a room or a building, and the trigger zone may be a designated space on a table in front of the external electronic device 200, or a designated space on a table where a user of the electronic device 100 may be seated.

The external electronic device 200, for example, the processor 210, receives location information (second location information) from the location device 300 indicating a location of the electronic device (host device) 100 relative to the location device 300. In some examples, a plurality of location devices 300 may be implemented or utilized to calculate or determine the relative location of the electronic device 100, and the plurality of location devices 300 may provide respective location information of the electronic device 100, to the external electronic device 200. The external electronic device 200 may calculate or determine the location of the electronic device 200 based on the location information received from the plurality of location devices 300 using a triangulation method, for example. For example, three location devices 300 may be implemented to provide a two-dimensional location of the electronic device 100 and four location devices 300 may be implemented to provide a three-dimensional location of the electronic device 100.

The processor 210 may determine whether the electronic device 100 is located in the trigger zone, sharing zone, or outside of the sharing zone, based on the first location information, the second location information, and the third location information. For example, the processor 210 may transmit various messages or information to the electronic device 100 based on the determined location of the electronic device 100. For example, when the electronic device 100 enters a sharing zone, the processor 210 may send a message to notify the electronic device 100 of a zone status indicating the electronic device 100 is in a sharing zone, and may provide a sharing zone name (e.g., a room name or name of the external electronic device 200). For example, when the electronic device 100 enters a trigger zone, the processor 210 may send a message to notify the electronic device 100 of a zone status indicating the electronic device 100 is in a trigger zone, and may provide a trigger zone name (e.g., a name associated with the designated space such as center of conference table, or name of the external electronic device 200). For example, a 2-bit flag may be used with the message to indicate the electronic device 100 is located in a trigger zone or sharing zone or both. For example, when the electronic device 100 enters a trigger zone, the processor 210 may send a message providing a device name, an internet protocol (IP) address of the external electronic device 200, or other identifying information of the external electronic device 200, so that the electronic device 100 may start to share content. For example, when the electronic device 100 leaves the trigger zone but still remains inside the sharing zone, the external electronic device 200 may send a message to notify the electronic device 100 of a zone status indicating the electronic device 100 is not in a trigger zone but is still in the sharing zone. For example, when the electronic device 100 leaves the sharing zone, the external electronic device 200 may send a message to notify the electronic device 100 of a zone status indicating the electronic device 100 is not in the sharing zone. The external electronic device 200 may send a message to notify the electronic device 100 to stop sharing content with the external electronic device 200. For example, the above-described messages may be transmitted via a UWB communication protocol. A UWB frame may carry up to 127 bytes of payload and the above-described messages may be carried by a UWB frame.

In response to a determination that the electronic device 100 is located in the trigger zone, the processor 210 may transmit identification information of the external electronic device 200 to the electronic device 100. For example, the external electronic device 200 may not transmit the identification information unless the electronic device 100 is in the trigger zone for a certain amount of time, for example, one or two seconds, for example, in case of inadvertent placement of the electronic device 100 in the trigger zone. The identification information may be transmitted from the external electronic device 200 to the electronic device 100 via a UWB communication protocol, for example. For example, the identification information of the external electronic device 200 may include an IP address of the external electronic device 200, a device name of the external electronic device 200, or other identifying information of the external electronic device 200.

The processor 210 may receive content shared by the electronic device 100 after transmitting the identification information. The processor 210 may receive the content shared by the electronic device 100 via a WI-FI communication protocol.

The processor 210 may also determine if the electronic device 100 is located outside of the sharing zone based on the second location information and the third location information. In response to a determination that the electronic device 100 is located outside of the sharing zone, the processor 210 may transmit information to the electronic device 100 to cause the electronic device 100 to stop sharing the content. For example, the information may be information indicating the electronic device 100 is outside of the sharing zone, or may be information instructing the electronic device 100 to stop sharing the content, for example an instruction to terminate or close the screen casting application. For example, the processor 210 may transmit the information to the electronic device 100 via the ultra-wideband communication protocol. As another example, in response to a determination that the electronic device 100 is located outside of the sharing zone, the processor 210 may unilaterally terminate communication with the electronic device 100 via the WI-FI communication protocol so that the external electronic device 200 no longer receives the content shared by the electronic device 100.

As mentioned above, in another example the external electronic device 200 may transmit identification information of the external electronic device 200 when the external electronic device 200 determines the electronic device 100 is located in the sharing zone, and the external electronic device 200 may transmit trigger zone information to the electronic device 100 when the external electronic device 200 determines the electronic device 100 is located in the trigger zone. For example, the external electronic device 200 may not transmit the trigger zone information unless the electronic device 100 is in the trigger zone for a certain amount of time, for example, one or two seconds, for example, in case of inadvertent placement of the electronic device 100 in the trigger zone. The trigger zone information may be information indicating the electronic device 100 is located in the trigger zone, or may be information which includes instructions to the electronic device 100 to start sharing content with the external electronic device 200. For example, the processor 210 may transmit the trigger zone information to the electronic device 100 via the ultra-wideband communication protocol.

After the electronic device 100 receives the trigger zone information the processor 210 may receive content shared by the electronic device 100.

For example, the location-based content-sharing application 270 may be a program which includes instructions executed by the processor 210 to calculate or determine a location of the electronic device 100 based on the first location information, the second location information, and the third location information. The location-based content-sharing application 270 may be an application or program which includes instructions executed by the processor 210 to transmit identification information of the external electronic device 200 to the electronic device 100 based on the determined location of the electronic device 100. The location-based content-sharing application 270 may be a program which includes instructions executed by the processor 210 to transmit trigger zone information of the external electronic device 200 to the electronic device 100 based on the determined location of the electronic device 100. For example, the location-based content-sharing application 270 may be a program which includes instructions executed by the processor 210 to, when the electronic device 100 is located outside of the sharing zone, transmit information to the electronic device 100 indicating the electronic device 100 is outside of the sharing zone, or the information may include instructions instructing the electronic device 100 to stop sharing the content, for example an instruction to terminate or close the screen casting application.

Figure 3A:
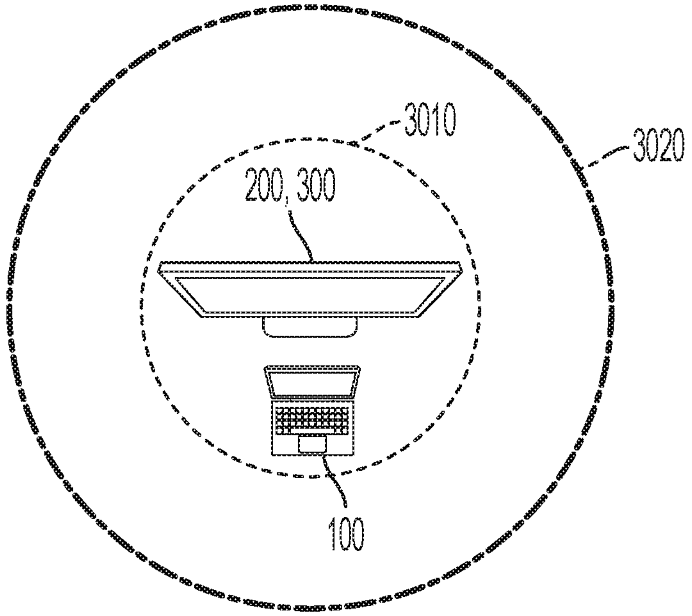
FIGS. 3A-3B illustrates an example of location-based content sharing between an electronic device and external electronic device, according to examples of the disclosure.
Figure 3B:
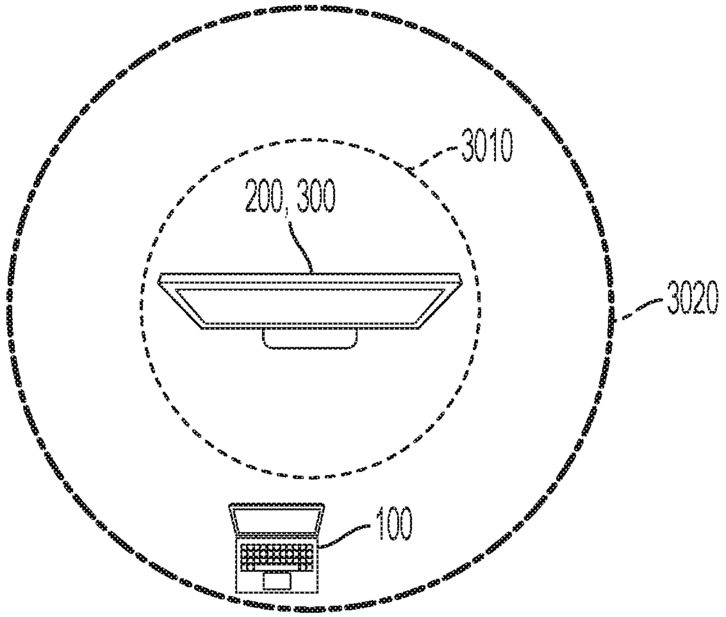

Referring now to FIGS. 3A-3B, an example of location-based content sharing between an electronic device and external electronic device is illustrated, according to examples of the disclosure.

In FIG. 3A, the external electronic device 200, for example a smart display, stores location information (first location information) regarding the trigger zone (first zone) 3010 and location information (third location information) regarding the sharing zone (second zone) 3020. The external electronic device 200 may further include the location device 300. In the example, the UWB transceiver 310 of the location device 300 may be provided instead of, or in addition to, UWB transceiver 261 of the external electronic device 200 illustrated in FIG. 2.

For example, the external electronic device 200 may define or designate the trigger zone 3010 as a radius of 1 meter about the location device 300, and the sharing zone 3020 as a radius of 5 meters about the location device 300.

A location of the electronic device 100 relative to the location device 300 may be determined by using the UWB transceiver 161 of the electronic device and the UWB transceiver 310 of the location device 300. For example, the UWB transceiver 161 and UWB transceiver 310 may transmit and receive ranging messages via UWB communication, and the UWB transceiver 310 may determine a relative location of the UWB transceiver 161. For example, in FIG. 3A, the UWB transceiver 310 may determine the UWB transceiver 161 is one-half meter from the UWB transceiver 310.

The processor 210 may receive the location information of the electronic device 100 from the location device 300 and determine whether the electronic device 100 is located in the trigger zone 3010, sharing zone 3020, or outside of the sharing zone. For example, in FIG. 3A, the processor 210 may determine the electronic device 100 is located in the trigger zone 3010. For example, the processor 210 may compare the distance information obtained by the location device 300 with the known radius of the trigger zone 3010. In response to the determination that the electronic device 100 is located in the trigger zone 3010, the processor 210 may transmit identification information of the external electronic device 200 to the electronic device 100. In response to receiving the identification information, the processor 110 of the electronic device 100 may share the content which is displayed by the display device 120 with the external electronic device 200, for example, via a WI-FI communication protocol.

The processor 210 may receive the location information of the electronic device 100 from the location device 300 continuously, or at regular or irregular intervals of time. For example, in FIG. 3B, the processor 210 may subsequently determine the electronic device 100 is located in the sharing zone 3020. For example, the processor 210 may compare the distance information obtained by the location device 300 with the known radii of the trigger zone 3010 and sharing zone 3020. In response to the determination that the electronic device 100 is located in the sharing zone 3020, the processor 210 may transmit information to the electronic device 100 indicating the electronic device 100 remains within the sharing zone 3020, or the processor 210 may not transmit any information to the electronic device 100. The processor 110 may continue to share the content which is displayed by the display device 120 with the external electronic device 200, for example, via the WI-FI communication protocol, in response to receiving the information indicating the electronic device 100 remains within the sharing zone 3020 or in response to not receiving any information from the external electronic device 200.

For example, the processor 210 may subsequently determine the electronic device 100 is located outside of the sharing zone 3020. For example, the processor 210 may compare the distance information obtained by the location device 300 with the known radii of the trigger zone 3010 and sharing zone 3020. In response to the determination that the electronic device 100 is located outside the sharing zone 3020, the processor 210 may transmit information to the electronic device 100 to cause the electronic device 100 to stop sharing the content. The processor 110 may, in response to the electronic device 100 receiving information from the external electronic device 200 indicating the electronic device 100 is located outside of the sharing zone 3020, stop sharing the content with the external electronic device 200.

Figure 4:
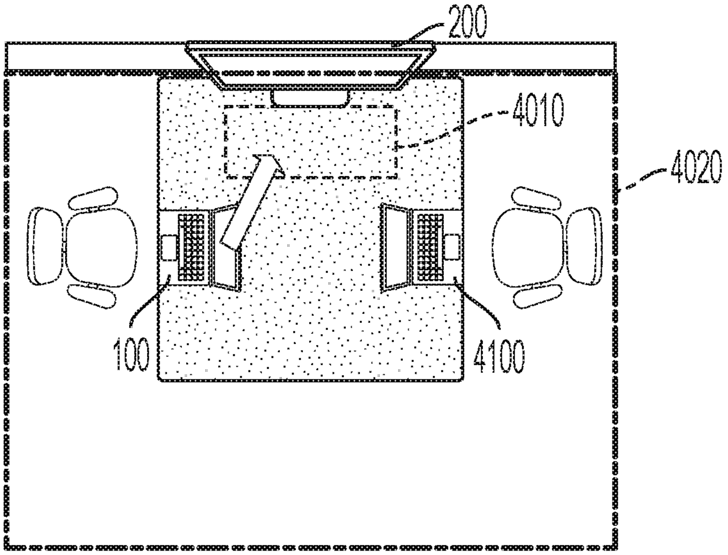
FIGS. 4-5 illustrate examples of location-based content sharing between electronic devices, according to examples of the disclosure.
Figure 5:
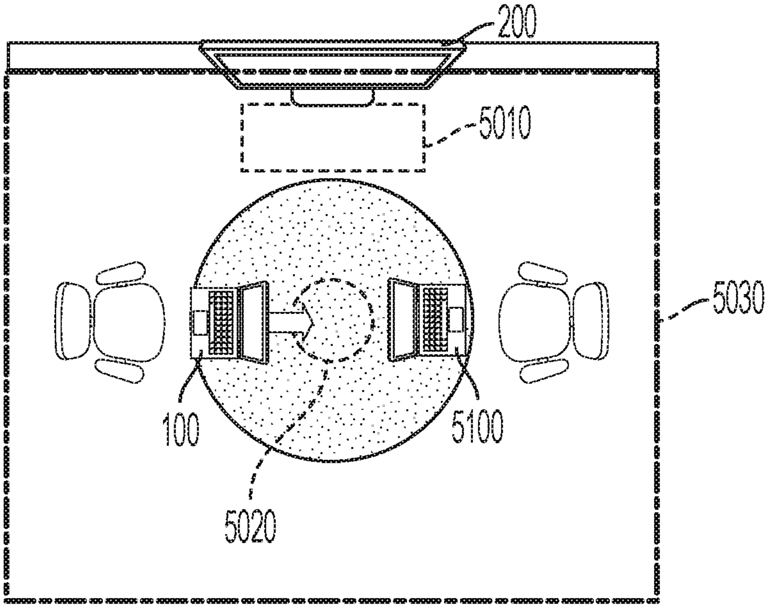

Referring now to FIGS. 4-5, examples of location-based content sharing between electronic devices are illustrated, according to examples of the disclosure.

In FIG. 4, the external electronic device 200, for example a smart display, stores location information (first location information) regarding the trigger zone (first zone) 4010 and location information (third location information) regarding the sharing zone (second zone) 4020. In FIG. 4, the trigger zone 4010 is disposed separately from the external electronic device 200, such that the trigger zone does not overlap the external electronic device 200. In FIG. 4, the trigger zone 4010 and sharing zone 4020 are rectangular in shape. For example, the trigger zone 4010 may correspond to an area on a table in front of the smart display, and sharing zone 4020 may correspond to the dimensions of a room, or an area inside of the room. The configuration and location information of the trigger zone 4010 and sharing zone 4020 may be set up by various methods which will be described later.

Because the trigger zone 4010 and sharing zone 4020 are either two-dimensional or three-dimensional spaces, a plurality of location devices 300 may be used to determine whether the electronic device 100 is located within the trigger zone 4010, within the sharing zone 4020, or outside of the sharing zone 4020. Though not shown in FIG. 4, the location devices 300 may be disposed or positioned at fixed locations which are known (stored) by the external electronic device 200. For example, the location devices 300 may serve as reference points and be located at a corner of the room, a floor of the room, a ceiling of the room, at the external electronic device 200, or at another location. The location devices 300 may or may not be disposed inside of the sharing zone 4020. The external electronic device 200 may receive relative location information of the electronic device 100 to the various location devices 300. The external electronic device 200 may store information about the location of the location devices 300. The external electronic device 200 may also store location information about the room (sharing zone 4020) as well as location information about the trigger zone 4010. Based on the location information of the electronic device 100 received from the plurality of location devices 300, the external electronic device 200 may use a triangulation or other localization method, for example, to determine the location of the electronic device 100 and determine whether the location of the electronic device 100 is located inside the trigger zone 4010, sharing zone 4020, or outside of the sharing zone 4020.

Operations of the electronic device 100 and external electronic device 200 with respect to content sharing based on the location of the electronic device 100 (e.g., whether the electronic device 100 is located inside the trigger zone, sharing zone, or outside of the sharing zone) are similar to the examples already described herein and will not be repeated for the sake of brevity.

Also illustrated in FIG. 4 is a second electronic device 4100. According to an example, if a user of the electronic device 100 is sharing content with the external electronic device 200 and the user of the second electronic device 4100 moves the second electronic device 4100 into trigger zone 4010, the external electronic device 200 may switch from displaying the content of the electronic device 100 to displaying the content of the second electronic device 4100. For example, if the external electronic device 200 determines the second electronic device 4100 is located in the trigger zone 4010, the external electronic device 200 may transmit information to the electronic device 100 to cause the electronic device 100 to stop sharing the content. For example, the information may be information indicating another electronic device is requesting to share content with the external electronic device 200, or may be information instructing the electronic device 100 to stop sharing the content, for example an instruction to terminate or close the screen casting application. As another example, when the second electronic device 4100 is moved into the trigger zone 4010 while the electronic device 100 shares content with the external electronic device 200, the external electronic device 200 may unilaterally terminate communication with the electronic device 100 via the WI-FI communication protocol so that the external electronic device 200 no longer receives the content shared by the electronic device 100.

For example, the location-based content-sharing application 270 may be a program which includes instructions executed by the processor 210 to, when the second electronic device 4100 is moved into the trigger zone while the electronic device 100 shares content with the external electronic device 200, transmit information to the electronic device 100 indicating the electronic device 100 is to stop sharing the content. For example, the information may indicate another electronic device is requesting to share content with the external electronic device 200, or the information may include an instruction to terminate or close the screen casting application. As another example, the location-based content-sharing application 270 may be a program which includes instructions executed by the processor 210 to, when the second electronic device 4100 is moved into the trigger zone while the electronic device 100 shares content with the external electronic device 200, unilaterally terminate communication with the electronic device 100 via the WI-FI communication protocol so that the external electronic device 200 no longer receives the content shared by the electronic device 100.

For example, the location-based content-sharing application 170 may be a program which includes instructions executed by the processor 110 to stop sharing the content with the external electronic device 200, in response to receiving information indicating another electronic device is requesting to share content with the external electronic device 200, or in response to receiving information instructing the electronic device 100 to stop sharing the content, for example an instruction to terminate or close the screen casting application.

As another example, if a user of the electronic device 100 is sharing content with the external electronic device 200 and the user of the second electronic device 4100 moves the second electronic device 4100 into trigger zone 4010, the external electronic device 200 may display both the content of the electronic device 100 and the content of the second electronic device 4100, for example by splitting a screen of the display device 220.

For example, the location-based content-sharing application 270 may be a program which includes instructions executed by the processor 210 to, when the second electronic device 4100 is moved into the trigger zone while the electronic device 100 shares content with the external electronic device 200, to control the display device 220 to divide a screen of the display device 220 so that content from both the electronic device 100 and the second electronic device 4100 are displayed at a same time.

Referring now to FIG. 5, the external electronic device 200, for example a smart display, stores location information (first location information) regarding a plurality of trigger zones (first zones) 5010, 5020 and location information (third location information) regarding the sharing zone (second zone) 5030. In FIG. 5, the trigger zones 5010, 5020 are disposed separately from the external electronic device 200, such that the trigger zones do not overlap the external electronic device 200. In FIG. 5, the trigger zone 5010 and sharing zone 5030 are rectangular in shape while trigger zone 5020 is circular in shape. For example, the trigger zone 5010 may correspond to an area in front of the external electronic device 200, trigger zone 5020 may correspond to an area of a table, and sharing zone 5030 may correspond to the dimensions of a room, or an area inside of the room. The configuration and location information of the trigger zones 5010, 5020 and sharing zone 5030 may be set up by various methods which will be described later.

Similar to the example of FIG. 4, because the trigger zones 5010, 5020 and sharing zone 5030 are either two-dimensional or three-dimensional spaces, a plurality of location devices 300 may be used to determine whether the electronic device 100 is located within the trigger zones 5010, 5020, the sharing zone 5030, or outside of the sharing zone 5030. The external electronic device 200 may receive relative location information of the electronic device 100 to the various location devices 300 which may or may not be disposed inside of the sharing zone 5030.

Operations of the electronic device 100 and external electronic device 200 with respect to content sharing based on the location of the electronic device 100 (e.g., whether the electronic device 100 is located inside the trigger zone, sharing zone, or outside of the sharing zone) are similar to the examples already described herein and will not be repeated for the sake of brevity. Likewise, operations of the electronic device 100, external electronic device 200, and second electronic device 5100 with respect to content sharing when the second electronic device 5100 is moved into a trigger zone 5010, 5020 while electronic device 100 shares content with external electronic device 200, are similar to the examples already described herein, and will not be repeated for the sake of brevity.

Figure 6:
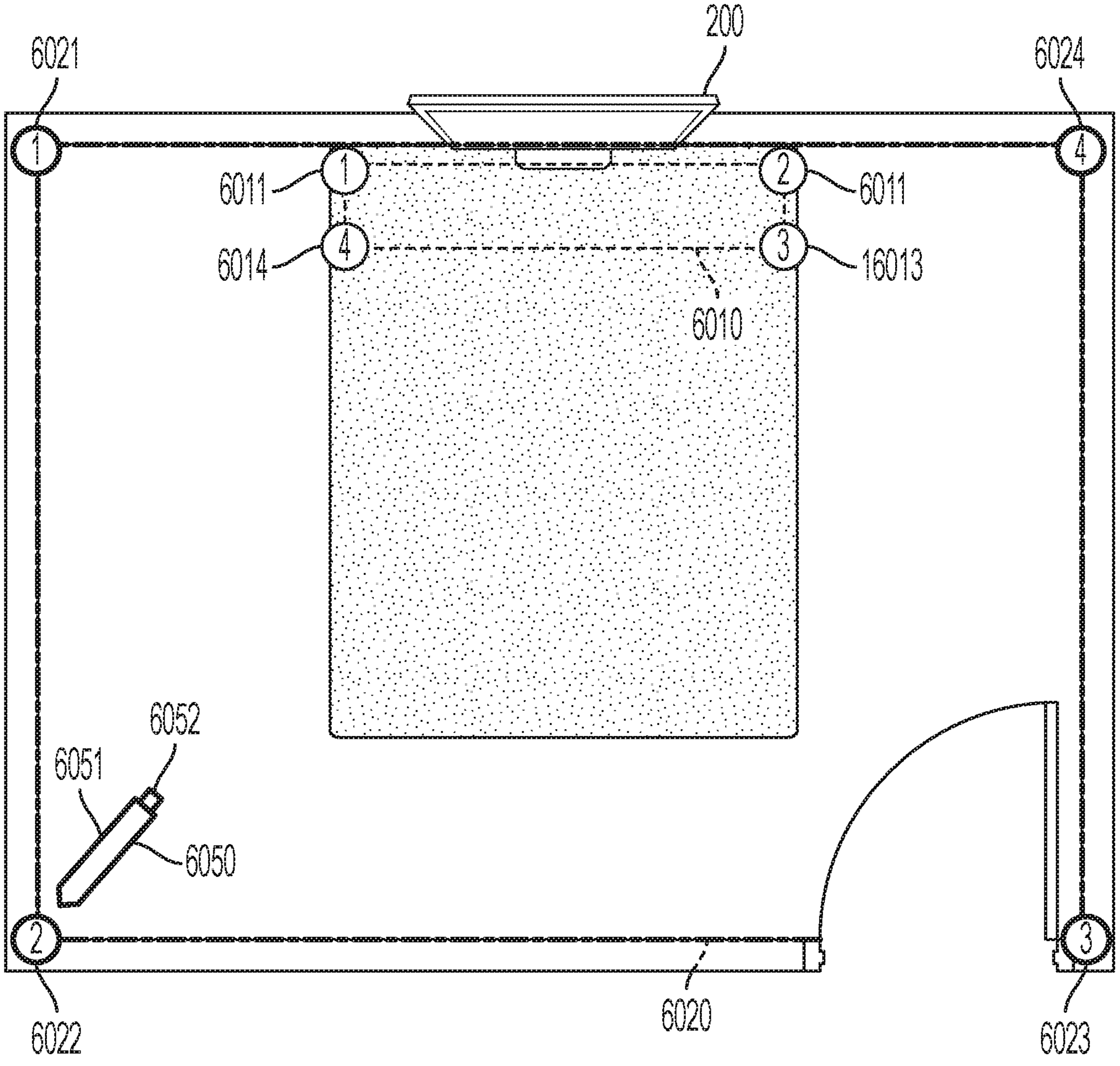
FIGS. 6-7 illustrate example methods for configuring a trigger zone and sharing zone, according to examples of the disclosure.

FIG. 6 is an example method for configuring a trigger zone and sharing zone using a UWB zone marker device, according to examples of the disclosure.

Referring to FIG. 6, a trigger zone 6010 and sharing zone 6020 are configured using a UWB zone marker device 6050. The trigger zone 6010 and sharing zone 6020 may be configured to be in the shape of a polygon, for example, a rectangular shape. However, the shape of the trigger zone 6010 and sharing zone 6020 are not so limited and other polygon or non-polygon shapes may be configured using the UWB zone marker device 6050.

For example, to configure the trigger zone 6010 and sharing zone 6020, the external electronic device 200 may store and execute a zone configuration application or program having various functions to define a trigger zone and sharing zone. In an example, a user holding the UWB zone marker device 6050 may mark each of the corners of a polygon, for example corners 6011-6014 of trigger zone 6010 and corners 6021-6024 of sharing zone 6020. For example, to mark and record the rectangular trigger zone 6010, the user launches the zone configuration application and selects a mark zone function. The user then moves the UWB zone marker device 6050 to locations of the table and uses the UWB zone marker device 6050 to mark the corner points 6011-6014, for example by moving the UWB zone marker device 6050 in either a clockwise or counterclockwise order. After that, the user may select a record zone function of the zone configuration application to complete and record the rectangular zone as a trigger zone associated with the external electronic device 200. Similarly, the user may move about to corners of the room and use the UWB zone marker device 6050 to mark the corner points 6021-6024, for example by moving the UWB zone marker device 6050 in either a clockwise or counterclockwise order. The user may then select the record zone function to complete and record the rectangular zone as a sharing zone associated with the external electronic device 200. For example, location information of the trigger zone 6010 and sharing zone 6020 may be stored in storage device 230.

The UWB zone marker device 6050 may include a UWB transceiver and may be in the shape of a pen. For example, the UWB zone marker device 6050 may have a body 6051 and a push button 6052 disposed at one end of the body 6051. The other end of the body 6051 may contain the UWB transceiver having an antenna near the tip. To mark a location, the user may place the tip to the exact location and then push the push button 6052. When the push button 6052 is pushed, the UWB zone marker device 6050 may transmit, via the UWB transceiver, location information of the UWB zone marker device 6050 relative to the external electronic device 200 having the UWB transceiver 261, and the external electronic device 200 may record and store location information of the UWB zone marker device 6050 in storage device 230. For example, the external electronic device 200 may store the marked location as a point which defines a trigger zone or sharing zone.

Figure 7:
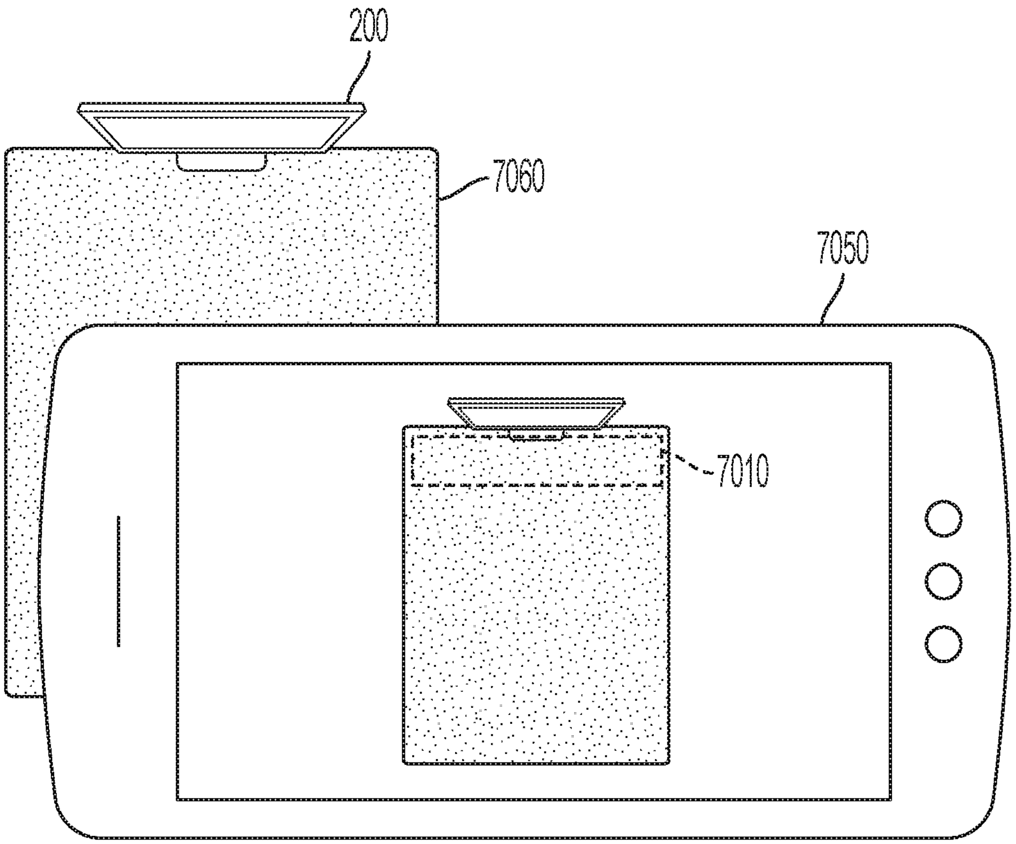

FIG. 7 is an example method for configuring a trigger zone and sharing zone using an augmented reality (AR) zone configuration application, according to examples of the disclosure.

Referring to FIG. 7, a trigger zone 7010 may be configured using an AR zone configuration application which may be executed using a smart phone or tablet computer 7050, for example. The sharing zone may also be configured using the AR zone configuration application.

To configure a trigger zone and sharing zone, the external electronic device 200 may store and execute a zone configuration application or program having various functions to define a trigger zone and sharing zone. For example, a user may execute the AR zone configuration application on a smart phone or tablet to add zones which may be stored in the storage device 230 of the external electronic device 200. For example, the external electronic device 200 and smart phone or tablet computer 7050 may communicate with each other via a WI-FI network or via BLUETOOTH, or via a UWB communication protocol if the smart phone or tablet includes a UWB transceiver.

For example, to mark and record a trigger zone, the user may select a trigger zone having a defined shape, for example, a rectangle, square, triangle, circle, oval, and the like, from the AR zone configuration application. In the example shown in FIG. 7, the shape of the trigger zone 7010 is rectangular. After the trigger zone is selected, the user may position the trigger zone to overlap with a real-world location to define the trigger zone. For example, in FIG. 7 the trigger zone 7010 overlaps with a table 7060 positioned in front of the external electronic device 200. The size and location of the trigger zone and sharing zone may be changed easily using the AR zone configuration application, for example through zoom functions to enlarge or shrink a size of the trigger zone or sharing zone, by moving the smart phone or tablet as needed to define the trigger zone or sharing zone with respect to a real-world object, or by another functionality provided by the AR zone configuration application. Once a trigger zone or sharing zone is finalized in the AR zone configuration application, location information of the trigger zone or sharing zone relative to the external electronic device 200 may be transmitted to the external electronic device 200 to be recorded and stored in the storage device 230.

Figure 8:
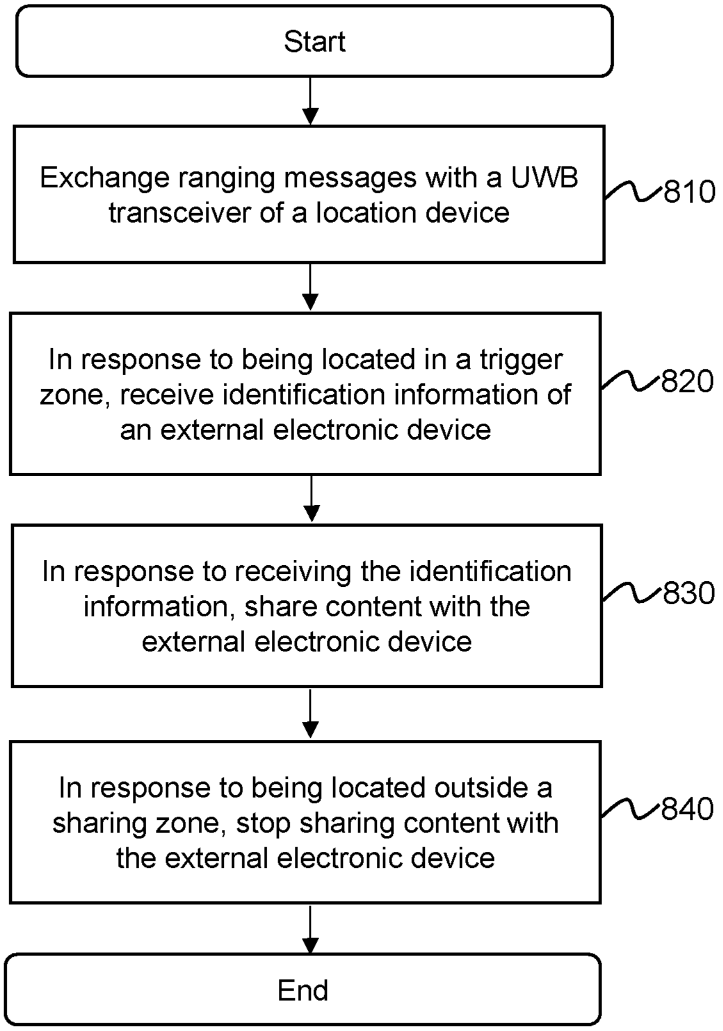
FIGS. 8-9 are example workflows for sharing content based on a location of an electronic device, according to examples of the disclosure.

FIG. 8 illustrates an example workflow 800 for sharing content based on a location of an electronic device, according to examples of the disclosure.

Referring to FIG. 8, at operation 810 the electronic device 100 may exchange ranging messages with the UWB transceiver 310 of the location device 300 via an UWB communication protocol to enable the location device 300 to locate the electronic device 100 relative to the location device 300.

At operation 820, in response to the electronic device 100 being located in the trigger zone (first zone) of the external electronic device 200, the processor 110 of the electronic device 100 may receive, from the external electronic device 200, the identification information of the external electronic device 200. The identification information of the external electronic device 200 may include an internet protocol (IP address) of the external electronic device 200, a device name of the external electronic device 200, or other identifying information.

At operation 830, in response to receiving the identification information when the electronic device 100 has been located in the trigger zone, the processor 110 of the electronic device 100 may share the content which is displayed by the display device 120 with the external electronic device 200.

At operation 840, in response to the electronic device 100 being located outside of the sharing zone (second zone) of the external electronic device 200, the processor 110 of the electronic device 100 may stop sharing the content with the external electronic device 200.

Figure 9:
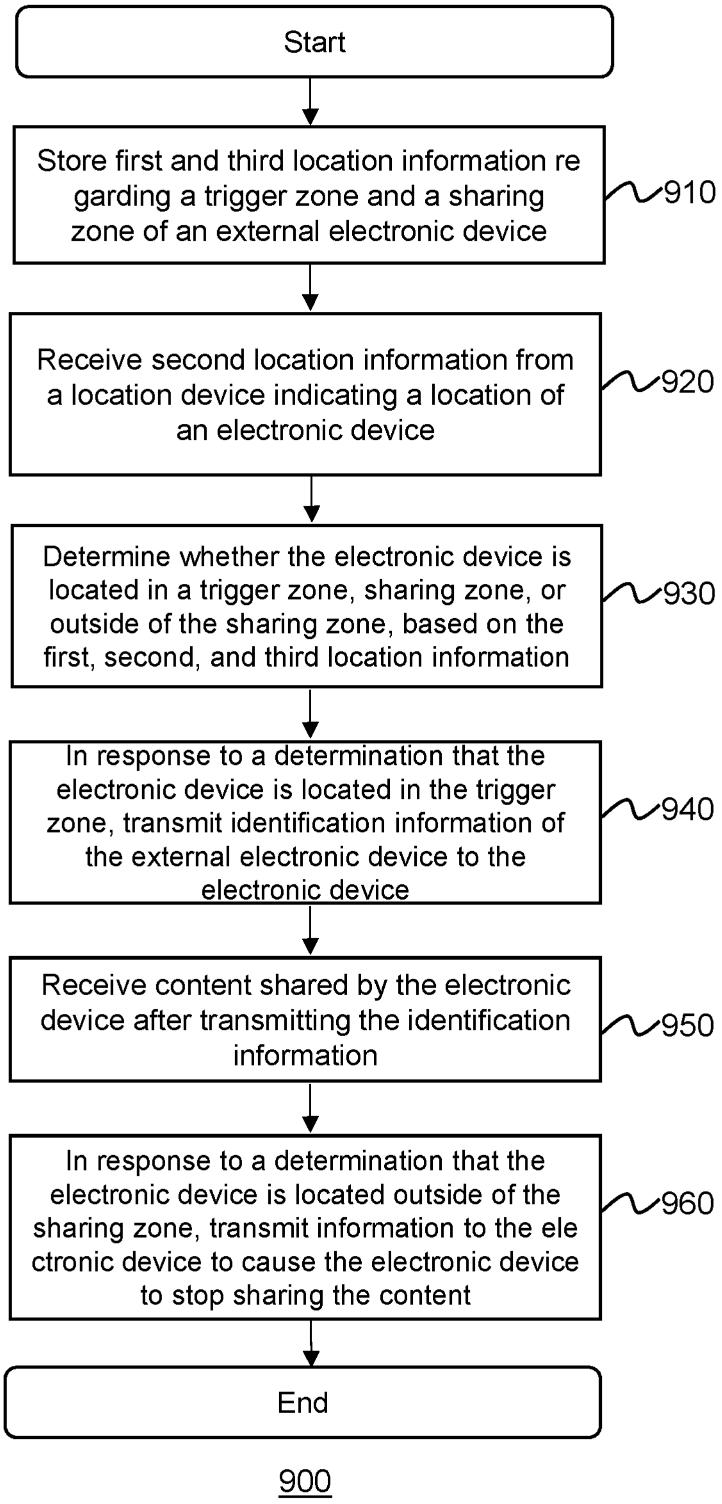

FIG. 9 illustrates an example workflow 900 for sharing content based on a location of an electronic device, according to examples of the disclosure.

Referring to FIG. 9, at operation 910 the external electronic device 200 may store location information (first location information) regarding the first zone (trigger zone) and location information (third location information) regarding the second zone (sharing zone) in storage device 230.

At operation 920, the external electronic device 200 may receive location information (second location information) from the location device 300 indicating a location of the electronic device (host device) 100 relative to the location device 300.

At operation 930, processor 210 of the external electronic device 200 may determine whether the electronic device 100 is located in the trigger zone, sharing zone, or outside of the sharing zone, based on the first location information, the second location information, and the third location information.

At operation 940, in response to a determination that the electronic device 100 is located in the trigger zone, the processor 210 of the external electronic device 200 may transmit identification information of the external electronic device 200 to the electronic device 100.

At operation 950, the external electronic device 200 may receive content shared by the electronic device 100 after transmitting the identification information.

At operation 960, in response to a determination that the electronic device 100 is located outside of the sharing zone, the processor 210 of the external electronic device 200 may transmit information to the electronic device 100 to cause the electronic device 100 to stop sharing the content.

Figure 10:
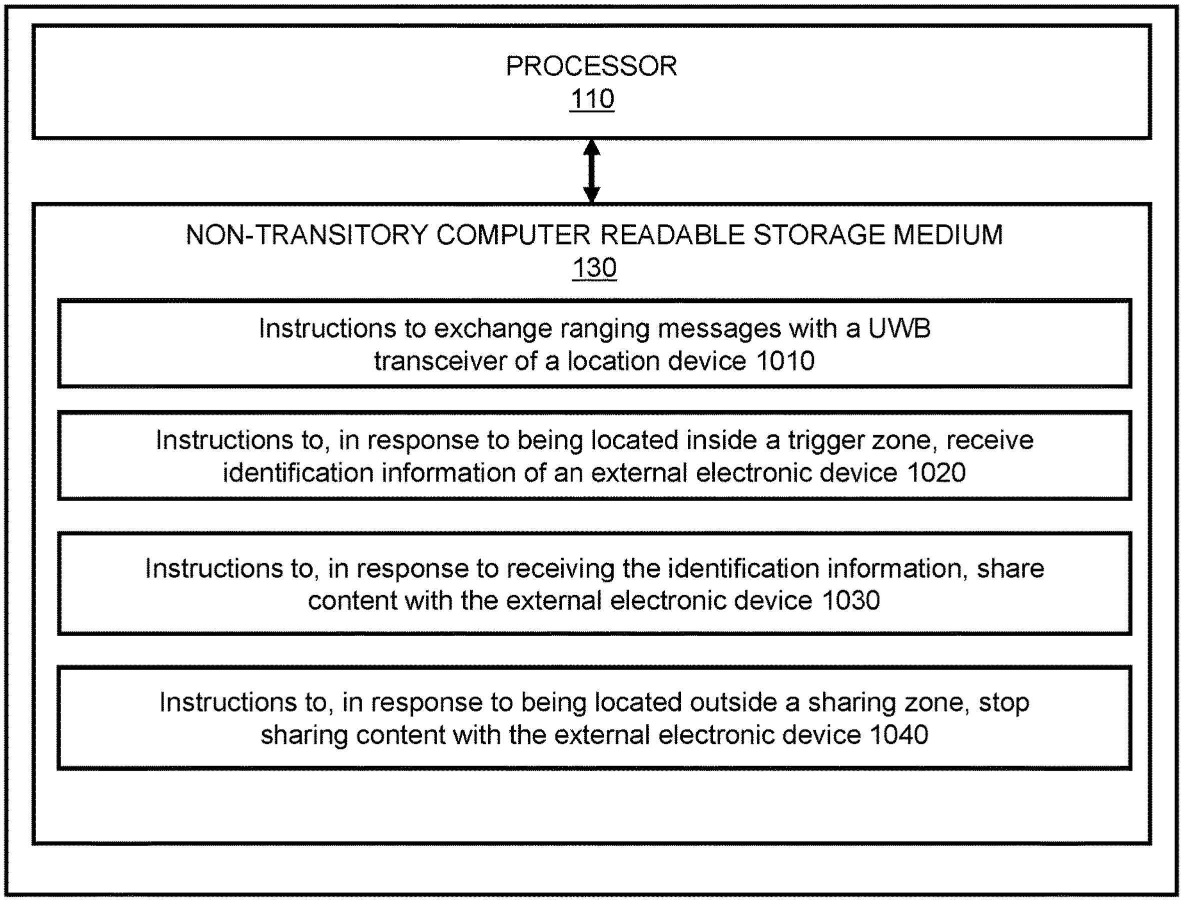
FIG. 10 illustrates an example apparatus for sharing content based on a location of the apparatus, according to examples of the disclosure.

FIG. 10 illustrates an example apparatus 1000 for sharing content based on a location of the apparatus, according to examples of the disclosure.

In an example, the apparatus 1000 may be the electronic device 100. The apparatus 1000 includes a processor 110 and non-transitory computer readable storage medium 130, where the term "non-transitory" does not encompass transitory propagating signals. The non-transitory computer readable storage medium 130 may include instructions 1010, 1020, 1030, and 1040 that, when executed by the processor 110, cause the processor 110 to perform various functions. For example, the instructions 1010, 1020, 1030, and 1040 may be instructions executed via the location-based content-sharing application 170.

The instructions 1010 may include instructions for the electronic device 100 to exchange ranging messages with the UWB transceiver 310 of the location device 300 via a UWB communication protocol to enable the location device 300 to locate the electronic device 100 relative to the location device 300.

Instructions 1020 may include instructions to, in response to the electronic device 100 being located in the trigger zone (first zone) of the external electronic device 200, receive, from the external electronic device 200, the identification information of the external electronic device 200.

Instructions 1030 may include instructions to, in response to receiving the identification information when the electronic device 100 has been located in the trigger zone, share the content which is displayed by the display device 120 with the external electronic device 200.

Instructions 1040 may include instructions to, in response to the electronic device 100 being located outside of the sharing zone (second zone) of the external electronic device 200, stop sharing the content with the external electronic device 200.

Additional instructions may be stored in the non-transitory computer readable storage medium 130 to perform various other functions of the electronic device 100 which are described herein. For example, additional instructions may include instructions to automatically launch a screen casting application to share the content with the external electronic device 200, in response to receiving the identification information, and instructions to automatically close the screen casting application to stop sharing content with the external electronic device 200, in response to receiving information indicating the electronic device 100 is outside of the sharing zone.

Figure 11:
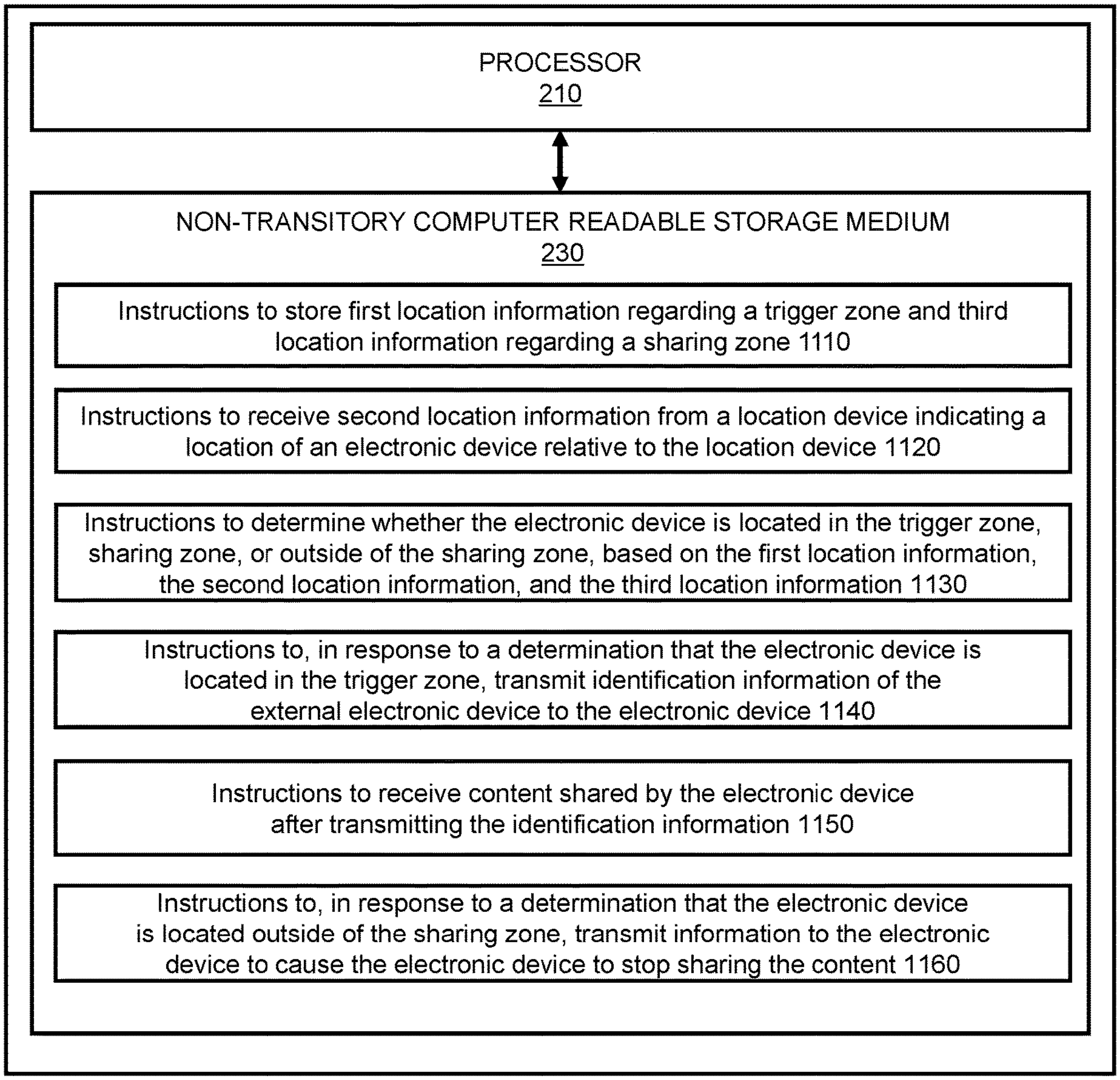
FIG. 11 illustrates an example apparatus with which content is shared based on a location of an electronic device, according to examples of the disclosure.

FIG. 11 illustrates an example apparatus 1100 with which content is shared based on a location of an electronic device, according to examples of the disclosure.

In an example, the apparatus 1100 may be the external electronic device 200. The apparatus 1100 includes a processor 210 and non-transitory computer readable storage medium 230. The non-transitory computer readable storage medium 230 may include instructions 1110, 1120, 1130, 1140, 1150, and 1160 that, when executed by the processor 210, cause the processor 210 to perform various functions. For example, the instructions 1110, 1120, 1130, 1140, 1150, and 1160 may be instructions executed via the location-based content-sharing application 270.

The instructions 1110 may include instructions for the external electronic device 200 to store location information (first location information) regarding the first zone (trigger zone) and location information (third location information) regarding the second zone (sharing zone).

Instructions 1120 may include instructions to receive location information (second location information) from the location device 300 indicating a location of the electronic device (host device) 100 relative to the location device 300.

Instructions 1130 may include instructions to determine whether the electronic device 100 is located in the trigger zone, sharing zone, or outside of the sharing zone, based on the first location information, the second location information, and the third location information.

Instructions 1140 may include instructions to, in response to a determination that the electronic device 100 is located in the trigger zone, transmit identification information of the external electronic device 200 to the electronic device 100.

Instructions 1150 may include instructions to receive content shared by the electronic device 100 after transmitting the identification information.

Instructions 1160 may include instructions to, in response to a determination that the electronic device 100 is located outside of the sharing zone, transmit information to the electronic device 100 to cause the electronic device 100 to stop sharing the content.

Additional instructions may be stored in the non-transitory computer readable storage medium 230 to perform various other functions of the external electronic device 200 which are described herein. For example, additional instructions may include instructions to, when the electronic device 100 enters a sharing zone or trigger zone, transmit a message to notify the electronic device 100 of a zone status indicating the electronic device 100 is in the sharing zone or trigger zone, and provide a sharing zone or trigger zone name. For example, additional instructions may include instructions to, when the electronic device 100 leaves the trigger zone but still remains inside the sharing zone, transmit a message to notify the electronic device 100 of a zone status indicating the electronic device 100 is not in a trigger zone but is still in the sharing zone. For example, additional instructions may include instructions to, when the electronic device 100 leaves the sharing zone, transmit a message to notify the electronic device 100 of a zone status indicating the electronic device 100 is not in the sharing zone. For example, additional instructions may include instructions to, when a second electronic device enters a trigger zone while the electronic device 100 shares content with the external electronic device 200, transmit a message to notify the electronic device 100 to stop sharing content or control the display device 220 to divide a screen so that content shared by the electronic device 100 and the second electronic device may be displayed at a same time.

According to the above-described examples, sharing of content between an electronic device and an external electronic device may be performed based on a location of the electronic device. According to the above-described examples, the content may be shared automatically without the need for a user to provide an input to the electronic device to launch an application to share the content or to enter a security code. Furthermore, the examples described herein provide accurate location information of the electronic device based on location information being obtained via UWB ranging messages exchanged between the electronic device and a location device.

Executable instructions to perform processes or operations in accordance with the above-described examples may be recorded in a computer readable storage medium. A processor may execute the executable instructions to perform the processes or operations. Examples of instructions include both machine code, such as that produced by a compiler, and files containing higher level code that may be executed by the controller using an interpreter. The computer readable storage medium may be distributed among computer systems connected through a network and computer-readable codes or instructions may be stored and executed in a decentralized manner.

Each block of the flowchart illustrations may represent a module, segment, or portion of code, which comprises one or more executable instructions for implementing the specified logical function(s). In some examples, the functions noted in the blocks may occur out of order. For example, two blocks shown in succession may be executed substantially concurrently (simultaneously) or the blocks may sometimes be executed in the reverse order, depending upon the functionality involved.

When it is stated in the disclosure that one element is "connected to" another element, the expression encompasses an example of a direct connection or direct coupling, as well as a connection with another element interposed therebetween. Further, when it is stated herein that one element "includes" another element, unless otherwise stated explicitly, it means that yet another element may be further included rather than being excluded.

The foregoing examples are merely examples and are not to be construed as limiting the disclosure. The disclosure can be readily applied to other types of apparatuses. Various modifications may be made which are also intended to be encompassed by the disclosure. Also, the description of the examples of the disclosure is intended to be illustrative, and not to limit the scope of the claims.

What is claimed is:

1. An electronic device, comprising:

a display device to display content;

a transceiver to exchange ranging messages with a location device to enable the location device to locate the electronic device relative to the location device; and a processor to:

designate a first two-dimensional area or three-dimensional volume as a first zone of an external electronic device, designate a second two-dimensional area or three-dimensional volume as a second zone of the external electronic device, the second zone overlapping the first zone, and automatically without receiving a user input:

in response to the electronic device being located in the first zone, receive identification information of the external electronic device, in response to receiving the identification information, share the content with the external electronic device, in response to the electronic device being located outside of the first zone and inside of the second zone, continue to share the content with the external electronic device, and in response to the electronic device being located outside of the second zone, stop sharing the content with the external electronic device.

2. The electronic device of claim 1, wherein the transceiver is to exchange the ranging messages with the location device via an ultra-wideband communication protocol, and the processor is to share the content with the external electronic device via a WI-FI communication protocol.

3. The electronic device of claim 1, wherein the processor is to automatically launch, without receiving the user input, a content-sharing application to share the content with the external electronic device.

4. The electronic device of claim 1, wherein the second zone is not identical to the first zone.

5. The electronic device of claim 1, wherein the processor is to determine that the electronic device is located in the first zone of the external electronic device if the electronic device is present in the first zone of the external electronic device for a threshold amount of time.

6. The electronic device of claim 1, wherein the processor is to designate a plurality of first zones within the second zone, each of the plurality of first zones being a two-dimensional area or three-dimensional volume, and in response to the electronic device being located in any of the plurality of first zones, the processor is to receive the identification information of the external electronic device.

7. The electronic device of claim 1, wherein in response to a second electronic device being located in the first zone while the processor shares the content with the external electronic device, the processor is to stop sharing the content with the external electronic device.

8. An electronic device, comprising:

a memory to store first location information regarding a first zone and second location information regarding a second zone; and a processor to:

designate a first two-dimensional area or three-dimensional volume as the first zone and a second two-dimensional area or three-dimensional volume as the second zone, receive third location information from a location device indicating a location of a host device relative to the location device, determine if the host device is located in the first zone based on the first location information and the third location information, in response to a determination that the host device is located in the first zone, transmit identification information of the electronic device to the host device, receive content automatically shared by the host device without a user input at the host device, after transmitting the identification information, and determine if the host device is located outside of the first zone and inside of the second zone, and in response to a determination that the host device is located outside of the first zone and inside of the second zone, continue to receive the content shared by the host device.

9. The electronic device of claim 8, wherein the processor is to transmit the identification information of the electronic device to the host device via an ultra-wideband communication protocol, and the processor is to receive the content shared by the host device via a WI-FI communication protocol.

10. The electronic device of claim 8, wherein the second zone overlaps the first zone, and the processor is to:

determine if the host device is located outside of the second zone based on the second location information and the third location information, and in response to a determination that the host device is located outside of the second zone, transmit information to the host device to cause the host device to stop sharing the content.

11. The electronic device of claim 8, wherein the electronic device comprises the location device and the location device is disposed at the electronic device.

12. The electronic device of claim 8, wherein the first zone does not overlap with a location of the electronic device.

13. The electronic device of claim 8, wherein the processor is to receive an indication of a boundary of the first zone from a user of the electronic device, and the processor is to store the first location information in the memory based on the received indication.

14. An electronic device, comprising:

a display device to display content;

a transceiver to exchange ranging messages with a location device to enable the location device to locate the electronic device relative to the location device;

a memory to store a designation of a first two-dimensional area or three-dimensional volume as a first zone and a designation of a second two-dimensional area or three-dimensional volume as a second zone; and a processor to, automatically without receiving a user input:

when the electronic device is located in the first zone designated by an external electronic device, receive identification information of the external electronic device, in response to receiving the identification information, share the content with the external electronic device, in response to the electronic device being located outside of the first zone and inside of the second zone, continue to share the content with the external electronic device, and when the electronic device is moved outside of the second zone designated by the external electronic device, stop sharing the content with the external electronic device, the second zone overlapping the first zone.

15. The electronic device of claim 14, wherein the processor is to automatically launch a content-sharing application to share the content with the external electronic device.

16. The electronic device of claim 15, wherein when the electronic device is moved outside of the second zone, the electronic device is to receive information from the external electronic device indicating the electronic device is outside of the second zone, and in response to the electronic device receiving the information from the external electronic device indicating the electronic device is outside of the second zone, the processor is to automatically stop the content-sharing application to stop sharing the content with the external electronic device.

17. The electronic device of claim 14, wherein the identification information includes at least one of an IP address or a device name of the external electronic device.

18. The electronic device of claim 14, wherein the transceiver is to exchange the ranging messages with the location device via a first channel having a first bandwidth, and the processor is to share the content with the external electronic device via a second channel having a second bandwidth.

19. The electronic device of claim 14, wherein the second zone is larger than the first zone.

20. The electronic device of claim 14, wherein the transceiver is to communicate using an ultra-wideband protocol.

* * * * *